United States Patent
Sun et al.

(10) Patent No.: US 10,284,004 B2
(45) Date of Patent: May 7, 2019

(54) CHARGING SYSTEM WITH PEAK VOLTAGE DETECTION

(71) Applicant: Delta Electronics (Thailand) Public Company Limited, Samutprakarn (TH)

(72) Inventors: Hao Sun, Shanghai (CN); Jinfa Zhang, Shanghai (CN); Yueyong Meng, Shanghai (CN); Shuanggang Li, Shanghai (CN)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 0 days.

(21) Appl. No.: 15/836,367

(22) Filed: Dec. 8, 2017

(65) Prior Publication Data
US 2018/0166910 A1    Jun. 14, 2018

(30) Foreign Application Priority Data
Dec. 9, 2016    (CN) .......................... 2016 1 1131783

(51) Int. Cl.
| | |
|---|---|
| H02J 7/00 | (2006.01) |
| H02J 7/34 | (2006.01) |
| H02M 1/00 | (2006.01) |
| H02M 1/36 | (2007.01) |
| H02M 1/42 | (2007.01) |

(Continued)

(52) U.S. Cl.
CPC .............. *H02J 7/345* (2013.01); *B60L 53/20* (2019.02); *H02J 7/0036* (2013.01); *H02J 7/0052* (2013.01); *H02M 1/36* (2013.01); *B60L 2270/20* (2013.01); *H02M 1/4225* (2013.01); *H02M 3/33584* (2013.01); *H02M 2001/007* (2013.01); *Y02B 70/126* (2013.01)

(58) Field of Classification Search
CPC ............ B60L 11/1811; B60L 2270/20; H02M 2001/007; H02M 3/33584
USPC ......................................................... 320/166
See application file for complete search history.

(56) References Cited

U.S. PATENT DOCUMENTS

| | | | |
|---|---|---|---|
| 2009/0189571 A1* | 7/2009 | Lai .......................... | H02J 7/022 320/162 |
| 2010/0164278 A1* | 7/2010 | Oyobe .................... | B60L 50/16 307/9.1 |

FOREIGN PATENT DOCUMENTS

| | | |
|---|---|---|
| CN | 102301560 A | 12/2011 |
| CN | 205724952 U | 11/2016 |
| TW | I414122 B | 11/2013 |

(Continued)

*Primary Examiner* — David V Henze-Gongola
(74) *Attorney, Agent, or Firm* — Kirton McConkie; Evan R. Witt (57) ABSTRACT

A charging system and a method are provided. The charging system includes a power supply device, a charging module and a battery module. The charging module is detachably connected with the power supply device, and connected with the battery module. The charging module includes a power converting unit, a voltage regulator and a charging controller. When the power supply device and the charging module are connected with each other, the power converting unit of the charging module is in the backward direction and uses the electric power of the battery module to pre-charge a bus capacitor. If the voltage of the bus capacitor is higher than or equal to a first threshold value because of pre-charge, the voltage of an adjusting terminal of the charging module is adjusted. Consequently, the charging system is in a normal working mode.

20 Claims, 10 Drawing Sheets

(51) Int. Cl.
*B60L 53/20* (2019.01)
*H02M 3/335* (2006.01)

(56) References Cited

FOREIGN PATENT DOCUMENTS

| TW | I491158 B | 7/2015 |
|----|-----------|--------|
| WO | 2012128626 A2 | 9/2012 |

* cited by examiner

CHARGING SYSTEM WITH PEAK VOLTAGE DETECTION

FIELD OF THE INVENTION

The present invention relates to a charging system and a method, and more particularly to a charging system and a method for pre-charging a bus capacitor through a battery module when the charging system starts up.

BACKGROUND OF THE INVENTION

With increasing development of science and technology, charging systems are widely used in many fields. For example, charging systems are used for charging electric vehicles.

Generally, the charging system comprises a bus capacitor. When the charging system starts up to receive the input AC power, a large transient current is generated to charge the bus capacitor. The large transient current is also referred as an inrush current. The inrush current may damage the internal electronic components of the charging system.

For solving the above drawbacks, the conventional charging system is further equipped with an AC relay and a current-limiting resistor. The AC relay and the current-limiting resistor are connected to an input terminal of the charging system and connected with each other in parallel. Before the charging system starts up to receive the input AC power, the AC relay is turned off. Consequently, the current-limiting resistor limits the peak value of the current to decrease the inrush current. After the charging system finishing starting up, the AC relay is turned on. Consequently, the charging system receives the input AC power through the AC relay.

Since the charging system is additionally equipped with the AC relay and the current-limiting resistor, the cost of the charging system is increased. Moreover, since the AC relay has poor reliability and short life, the charging system is readily damaged. In addition, the AC relay with high power has not been introduced into the market. When the charging system is applied at a high power situation, the AC relay and the current-limiting resistor cannot be used.

Therefore, there is a need of providing a charging system and a method in order to overcome the above drawbacks.

SUMMARY OF THE INVENTION

An object of the present invention provides a charging system capable of limiting the inrush current. Since the inrush current is limited, the internal electronic components of the charging system are not damaged. Moreover, since the charging system is not equipped with the AC relay and the current-limiting resistor, the fabricating cost of the charging system is reduced and the reliability of the charging system is enhanced. Moreover, the charging system can be applied to the high power environment.

In accordance with an aspect of the present invention, there is provided a charging system. The charging system includes a power supply device, a connection confirmation module, a battery module, a charging module and a main control module. The power supply device includes a first power transmission terminal, a second power transmission terminal, a first signal output terminal and a power control unit. The first power transmission terminal receives AC power. The connection confirmation module includes a second signal output terminal. The charging module includes a third power transmission terminal and a fourth power transmission terminal. The third power transmission terminal is detachably connected with the second power transmission terminal of the power supply device. The charging module includes a DC/DC converter, a voltage regulator, a bus capacitor and a charging controller. The DC/DC converter has a bidirectional power converting function and is electrically connected between the bus capacitor and the fourth power transmission terminal. The fourth power transmission terminal is further connected with the battery module. An adjusting terminal of the voltage regulator is detachably connected with the first signal output terminal. The voltage regulator selectively adjusts a voltage of the adjusting terminal. The power control unit detects a voltage of the first signal output terminal. The charging controller receives a voltage of the second signal output terminal and the voltage of the adjusting terminal and detects a voltage of the battery module. The main control module is connected with the charging module and the second signal output terminal for receiving a feedback signal from the charging module and a signal from the second signal output terminal. If the charging controller detects that the voltage from the battery module is non-zero and the voltage from the adjusting terminal is a given voltage when the charging module is connected with the power supply device, the charging controller controls the DC/DC converter in a backward direction to convert electric power of the battery module, so that the bus capacitor is pre-charged by the converted electric power of the battery module. If the charging controller judges that a voltage of the bus capacitor is higher than or equal to a first threshold value, the charging controller controls the voltage regulator to adjust the voltage of the adjusting terminal toward a second threshold value. If the power control unit detects that a peak voltage of the adjusting terminal is equal to the second threshold value, the power control unit judges that the charging system is ready to charge the battery module.

In accordance with another aspect of the present invention, there is provided a method for a charging system. The charging system includes a power supply device, a charging module and a battery module. The power supply device includes a first signal output terminal and a power control unit. The charging module is detachably connected with the power supply device, and includes a DC/DC converter, a voltage regulator, a charging controller and a bus capacitor. The DC/DC converter is electrically connected between the bus capacitor and the battery module. An adjusting terminal of the voltage regulator is detachably connected with the first signal output terminal. The voltage regulator selectively adjusts a voltage of the adjusting terminal. The battery module is detachably connected with the charging module. The method includes the following steps. In a step (a), the charging controller judges whether a voltage from the battery module is a non-zero voltage and a peak voltage of the adjusting terminal is a given voltage. If a judging result of the step (a) is satisfied, a step (b) is performed. If the judging result of the step (a) is not satisfied, the charging controller judges that the charging system is abnormal and generates a notification signal. In a step (b), the charging controller controls the DC/DC converter in a backward direction, so that electric power from the battery module is converted by the DC/DC converter and the bus capacitor is pre-charged by the converted electric power. In a step (c), the charging controller judges whether a voltage of the bus capacitor is higher than or equal to a first threshold value. If a judging result of the step (c) is satisfied, a step (d) is performed. If the judging result of the step (c) is not satisfied, the step (b) is repeatedly done. In a step (d), the charging controller controls the voltage regulator to adjust the peak voltage of the adjusting terminal toward a second threshold value. In a step (e), the charging controller judges whether the peak voltage of the adjusting terminal is equal to the second threshold value. If the peak voltage of the adjusting terminal is equal to the second threshold value, the charging controller judges that the charging system is in a normal working mode. If the peak voltage of the adjusting terminal is not equal to the second threshold value, the charging controller judges that the charging system is abnormal and generates the notification signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
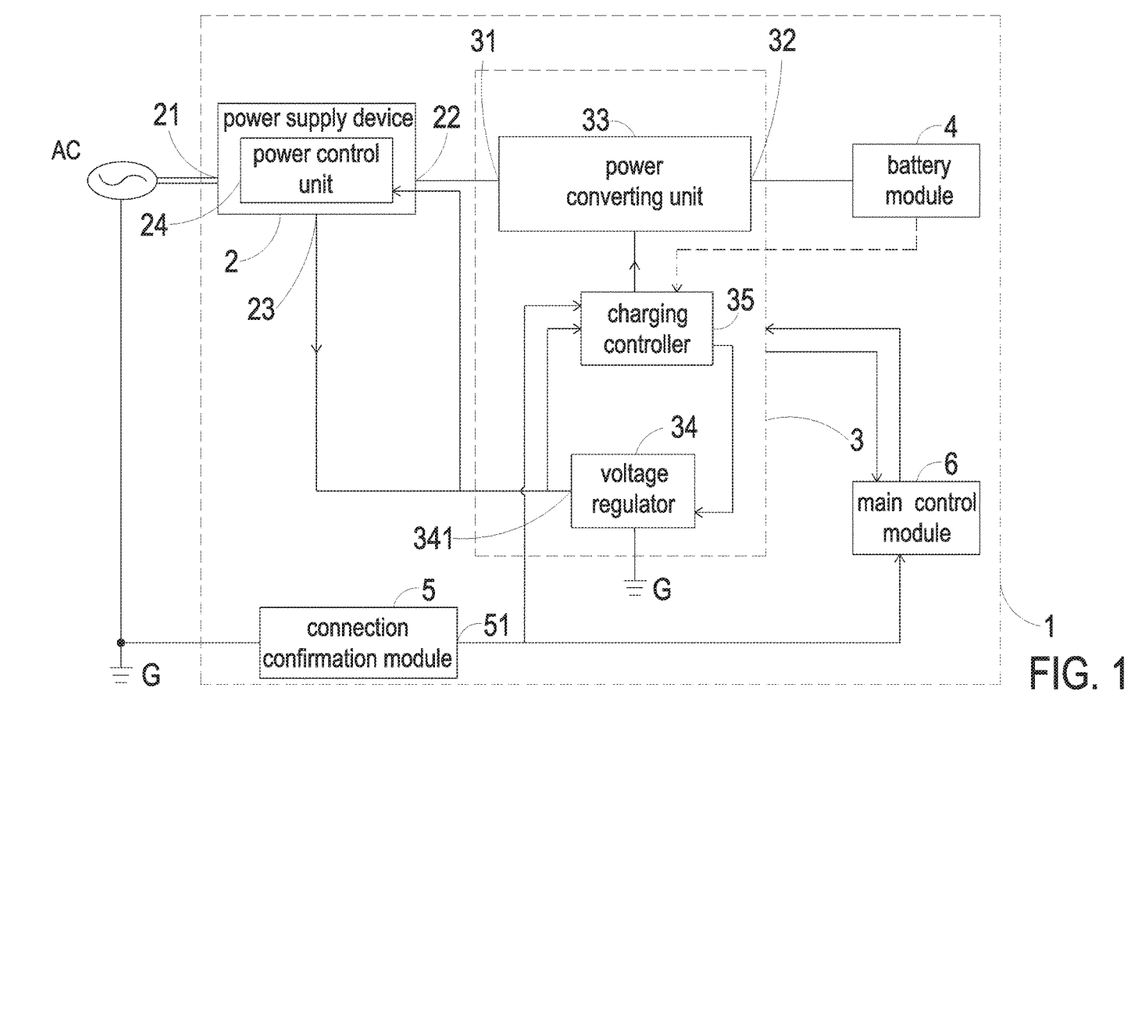
FIG. 1 schematically illustrates the architecture of a charging system according to an embodiment of the present invention.
Figure 2:
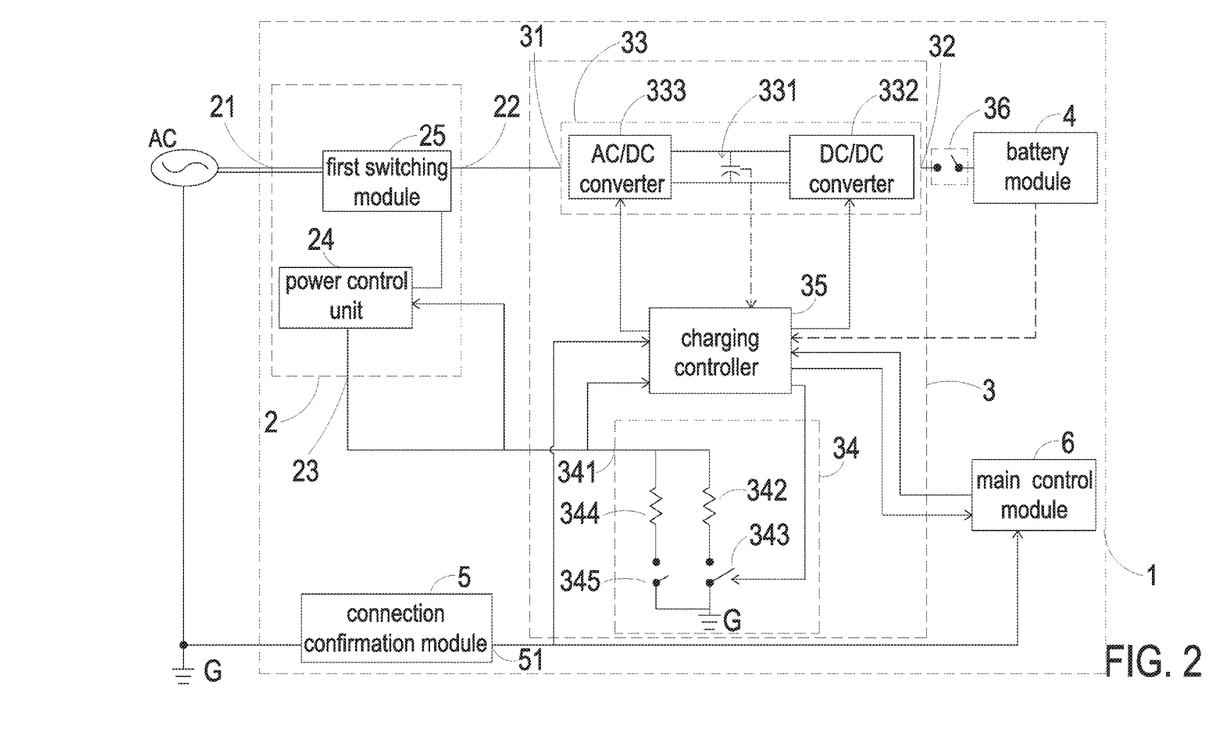
FIG. 2 is a schematic circuit diagram of the charging system of FIG. 1.

FIG. 1 schematically illustrates the architecture of a charging system according to an embodiment of the present invention. FIG. 2 is a schematic circuit diagram of the charging system of FIG. 1. As shown in FIG. 1, the charging system 1 is applied to an electric vehicle. The charging system 1 comprises a power supply device 2, a charging module 3, a battery module 4, a connection confirmation module 5 and a main control module 6.

An example of the power supply device 2 includes but not limited to an electric vehicle supply equipment (EVSE). The power supply device 2 is detachably connected with the charging module 3. The power supply device 2 comprises a first power transmission terminal 21, a second power transmission terminal 22, a first signal output terminal 23 and a power control unit 24. The first power transmission terminal 21 receives AC power. The power control unit 24 receives the given voltage from the adjusting terminal 341.

The connection confirmation module 5 detects the AC power. The connection confirmation module 5 comprises a second signal output terminal 51. The connection confirmation module 5 outputs a voltage to the second signal output terminal 51. The voltage of the second signal output terminal 51 is correspondingly changed according to whether the power supply device 2 and the charging module 3 are connected with each other or disconnected from each other.

An example of the charging module 3 includes but not limited to an on board charger module (OBCM). The charging module 3 is detachably connected with the power supply device 2. Moreover, the charging module 3 is connected with the battery module 4 in order to charge the battery module 4. The charging module 3 comprises a third power transmission terminal 31, a fourth power transmission terminal 32, a power converting unit 33, a voltage regulator 34 and a charging controller 35.

Please refer to FIGS. 1 and 2. The third power transmission terminal 31 of the charging module 3 is detachably connected with the second power transmission terminal 22 of the power supply device 2. The fourth power transmission terminal 32 is connected with the battery module 4.

The power converting unit 33 is electrically connected between the third power transmission terminal 31 and the fourth power transmission terminal 32. In this embodiment, the power converting unit 33 comprises an AC/DC converter 333, a bus capacitor 331 and a DC/DC converter 332. The DC/DC converter 332 is electrically connected between the bus capacitor 331 and the fourth power transmission terminal 32. The DC/DC converter 332 is a bidirectional power converter. According to the forward direction of the bidirectional power converter, the electric power from the bus capacitor 331 is converted by the DC/DC converter 332. According to the backward direction of the bidirectional power converter, the electric power from the fourth power transmission terminal 32 (i.e., the electric power form the battery module 4) is converted by the DC/DC converter 332.

The voltage regulator 34 is configured to judge the charging state by monitoring the voltage of the adjusting terminal 341. The voltage regulator 34 is electrically connected with a ground terminal G. The voltage regulator 34 comprises an adjusting terminal 341. The adjusting terminal 341 is connected with the first signal output terminal 23. The voltage of the adjusting terminal 341 is selectively adjusted by the voltage regulator 34.

The charging controller 35 is connected with the power converting unit 33, the voltage regulator 34 and the battery module 4. Moreover, the charging controller 35 is connected with the adjusting terminal 341 and the second signal output terminal 51. The charging controller 35 is used for detecting the voltage of the second signal output terminal 51, the peak voltage of the adjusting terminal 341 and the voltage of the battery module 4. Then the charging controller 35 controls the power converting unit 33 properly.

When the voltage of the second signal output terminal 51 is equal to the set voltage, the charging controller 35 judges that the charging module 3 is connected with the power supply device 2. Otherwise, the charging controller 35 judges that the charging module 3 is not connected with the power supply device 2.

When the third power transmission terminal 31 and the adjusting terminal 341 of the charging module 3 are respectively connected with the second power transmission terminal 22 and the first signal output terminal 23 of the power supply device 2 but the power converting unit 33 is not operated, the charging controller 35 detects the voltage from the battery module 4, the peak voltage of the adjusting terminal 341 and the voltage of the second signal output terminal 51. If the result of the detection is that the voltage from the battery module 4 is a non-zero voltage, the adjusting terminal 341 is the given voltage and the second signal output terminal 51 is the set voltage, the charging controller 35 controls the DC/DC converter 332 to perform in the backward direction. Consequently, the electric power from the fourth power transmission terminal 32 (i.e., from the battery module 4) is converted by the DC/DC converter 332, and the bus capacitor 331 is pre-charged by the converted electric power. Whereas, if the result of the detection is that voltage from the battery module 4 is a zero voltage or the adjusting terminal 341 is not a given voltage, the charging controller 35 judges that the charging system 1 is abnormal and generates a notification signal.

If the charging controller 35 detects that the voltage of the bus capacitor 331 is higher than or equal to a first threshold value because of pre-charging, the charging controller 35 controls the voltage regulator 34 to adjust the peak voltage of the adjusting terminal 341. Consequently, the voltage of the adjusting terminal 341 is decreased toward a second threshold value. Whereas, if the charging controller 35 detects that the voltage of the bus capacitor 331 is lower than the first threshold value, the voltage regulator 34 does not adjust the peak voltage of the adjusting terminal 341 under control of the charging controller 35.

While the charging controller 35 controls the voltage regulator 34 to adjust the peak voltage of the adjusting terminal 341 toward the second threshold value, the power control unit 24 detects the voltage of the adjusting terminal 341.

When the power control unit 24 detects that the peak voltage of the adjusting terminal 341 is equal to the second threshold value, the power control unit 24 judges that the charging system 1 is ready to charge the battery module 4. If the peak voltage of the adjusting terminal 341 is not equal to the second threshold value while the voltage of the adjusting terminal 341 is adjusted toward the second threshold value by the voltage regulator 34 under control of the charging controller 35, the charging controller 35 judges that the charging system 1 is abnormal and generates the notification signal. Also the charging controller 35 detects the peak voltage of the adjusting terminal 341. If the charging controller 35 detects that the peak voltage of the adjusting terminal 341 is equal to the second threshold value, the charging controller 35 judges that the charging system 1 is in a normal working mode. In the normal working mode, the AC power from the second power transmission terminal 22 is converted by the charging system 1.

The main control module 6 is connected with the charging module 3. The main control module 6 receives a feedback signal from the charging module 3 and the voltage of the second signal output terminal 51. According to the feedback signal, the main control module 6 realizes whether the charging system 1 is in the normal working mode. The feedback signal is generated by the internal circuit of the charging module 3 (e.g., the charging controller 35). According to the result of judgment whether the voltage of the second signal output terminal 51 is equal to the set voltage, the main control module 6 realizes whether the charging module 3 is connected with the power supply device 2. If the main control module 6 judges that the charging system 1 is in the normal working mode and the charging module 3 is connected with the power supply device 2, the main control module 6 issues a charge start signal to the charging controller 35 of the charging module 3.

When the charging system 1 is in the normal working mode and the charging module 3 is connected with the power supply device 2, if the self-test result of the charging module 3 indicates that the charging module 3 do not have faults and the charging system 1 is in the normal working mode, the charging controller 35 controls the voltage regulator 34 to adjust the peak voltage of the adjusting terminal 341 toward a third threshold value. Moreover, the charging controller 35 controls the power converting unit 33 in the forward direction. If the self-test result of the charging module 3 indicates that the charging module 3 has faults or the charging system 1 is not in the normal working mode, the charging controller 35 judges that the charging system 1 is abnormal and generates the notification signal.

Please refer to FIG. 2 again. The power supply device 2 further comprises a first switching module 25. The first switching module 25 is electrically connected between the first power transmission terminal 21 and the second power transmission terminal 22. When the first switching module 25 is turned on or turned off, the path between the first power transmission terminal 21 and the second power transmission terminal 22 is conducted or cut off correspondingly. The power control unit 24 comprises a first output terminal and a second output terminal. The first output terminal of the power control unit 24 is electrically connected with a control terminal of the first switching module 25. The power control unit 24 controls the on/off states of the first switching module 25 through the first output terminal. The second output terminal of the power control unit 24 is electrically connected with the first signal output terminal 23. The power control unit 24 transmits the set voltage to the first signal output terminal 23 through the second output terminal.

If the power control unit 24 detects that the peak voltage of the adjusting terminal 341 is equal to the third threshold value, the first switching module 25 is turned on under control of the power control unit 24. Consequently, the AC power is transmitted to the second power transmission terminal 22 through the first power transmission terminal 21 and the first switching module 25. Moreover, the charging controller 35 controls the power converting unit 33 in the forward direction. That is, the received electric power of the third power transmission terminal 31 (e.g. the outputted AC electric power of the second power transmission terminal 22) is converted by the AC/DC converter 333. The converted electric power charges the battery module 4. Whereas, if the power control unit 24 detects that the peak voltage of the adjusting terminal 341 is not equal to the third threshold value, the first switching module 25 is turned off under control of the power control unit 24. Consequently, the AC power cannot be transmitted to the second power transmission terminal 22 through the first power transmission terminal 21.

When the charging system 1 starts up, the third power transmission terminal 31 and the adjusting terminal 341 of the charging module 3 are respectively connected with the second power transmission terminal 22 and the first signal output terminal 23 of the power supply device 2. If the charging controller 35 detects that the voltage from the battery module 4 is non-zero, the voltage of the adjusting terminal 341 is the given voltage and the voltage of the second signal output terminal 51 is the set voltage, the power converting unit 33 is in the backward direction. Consequently, the bus capacitor 331 is pre-charged by the electric power of the battery module 4. When the power supply device 2 outputs the AC power and the DC/DC converter 332 is in the forward direction, the battery module 4 is charged by the AC power. Since the bus capacitor 331 is pre-charged to a predetermined voltage, large current is avoided to flow through the bus capacitor. Under this circumstance, the inrush current is limited when the charging system 1 starts up. Since the inrush current is limited, the internal electronic components of the charging system 1 are not damaged. Moreover, since the charging system 1 is not equipped with the AC relay and the current-limiting resistor, the cost of the charging system 1 is reduced and the reliability of the charging system 1 is enhanced. Moreover, the charging system 1 can be applied to the high power environment.

In another embodiment, the power converting unit 33 further comprise an AC/DC converter 333. The AC/DC converter 333 is electrically connected between the third power transmission terminal 31 and bus capacitor 331 and electrically connected with the charging controller 35. An example of the AC/DC converter 333 includes but not limited to a bridgeless power factor correction (PFC) converter. The operations of the AC/DC converter 333 are controlled by the charging controller 35. Consequently, the received electric power of the third power transmission terminal 31 (e.g. the AC electric power of the second power transmission terminal 22) is converted into a DC bus voltage by the AC/DC converter 333. Similarly, the AC/DC converter 333 can be a bidirectional power converter. That is, the received electric power of the third power transmission terminal 31 can be converted by the AC/DC converter 333, or the DC bus voltage of the bus capacitor 331 can be converted by the AC/DC converter 333 to the third power transmission terminal 31. When the DC/DC converter 332 in the forward direction under control of the charging controller 35, the stabilized DC bus voltage of the bus capacitor 331 is converted by the DC/DC converter 332. The converted electric power charges the battery module 4.

The adjusting terminal 341 of the voltage regulator 34 is adjusted according to the charge state of the charging system 1. The voltage regulator 34 comprises a first resistor 342 and a second switching module 343. The first resistor 342 and the second switching module 343 are connected with each other in series, and electrically connected between the ground terminal G and the adjusting terminal 341. The control terminal of the second switching module 343 is electrically connected with the charging controller 35. The on/off states of the second switching module 343 are controlled by the charging controller 35. If the charging controller 35 detects that the voltage of the bus capacitor 331 is higher than or equal to the first threshold value, the second switching module 343 is turned on under control of the charging controller 35. Since the path between the ground terminal G and the adjusting terminal 341 is conducted, the peak voltage of the adjusting terminal 341 is pulled down by the first resistor 342 and the voltage of the first signal output terminal 23 is equal to the second threshold value. If the charging controller 35 detects that the voltage of the bus capacitor 331 is lower than the first threshold value, the second switching module 343 is turned off under control of the charging controller 35. Since the path between the ground terminal G and the adjusting terminal 341 is shut off, the peak voltage of the adjusting terminal 341 cannot be pulled down by the first resistor 342. Consequently, the peak voltage of the adjusting terminal 341 is maintained.

The voltage regulator 34 further comprises a second resistor 344 and a third switching module 345. The second resistor 344 and the third switching module 345 are connected with each other in series, and electrically connected between the ground terminal G and the adjusting terminal 341. Moreover, the second resistor 344 and the third switching module 345 are connected with the first resistor 342 and the second switching module 343 in parallel. The control terminal of the third switching module 345 is electrically connected with the charging controller 35. The on/off states of the third switching module 345 are controlled by the charging controller 35. If the self-test result of the charging module 3 indicates that the charging module 3 do not have faults and the charging system 1 is in the normal working mode, the third switching module 345 is turned on under control of the charging controller 35. Since the path between the ground terminal G and the adjusting terminal 341 is conducted, the peak voltage of the adjusting terminal 341 is pulled down by the second resistor 344 and the voltage of the first signal output terminal 23 is equal to the third threshold value. If the self-test result of the charging module 3 indicates that the charging module 3 have faults or the charging system 1 is not in the normal working mode, the third switching module 345 is turned off under control of the charging controller 35. Since the path between the ground terminal G and the adjusting terminal 341 is shut off, the peak voltage of the adjusting terminal 341 cannot be pulled down by the second resistor 344. Consequently, the peak voltage of the adjusting terminal 341 is maintained.

In some embodiments, the adjusting terminal 341 of the voltage regulator 34 is detachably connected with the first signal output terminal 23 through a diode (not shown).

In some embodiments, the charging system 1 further comprises a relay 36. The relay 36 is electrically connected between the battery module 4 and the charging module 3. The battery module 4 and the charging module 3 are selectively connected with each other or disconnected from each other through the relay 36.

Figure 3:
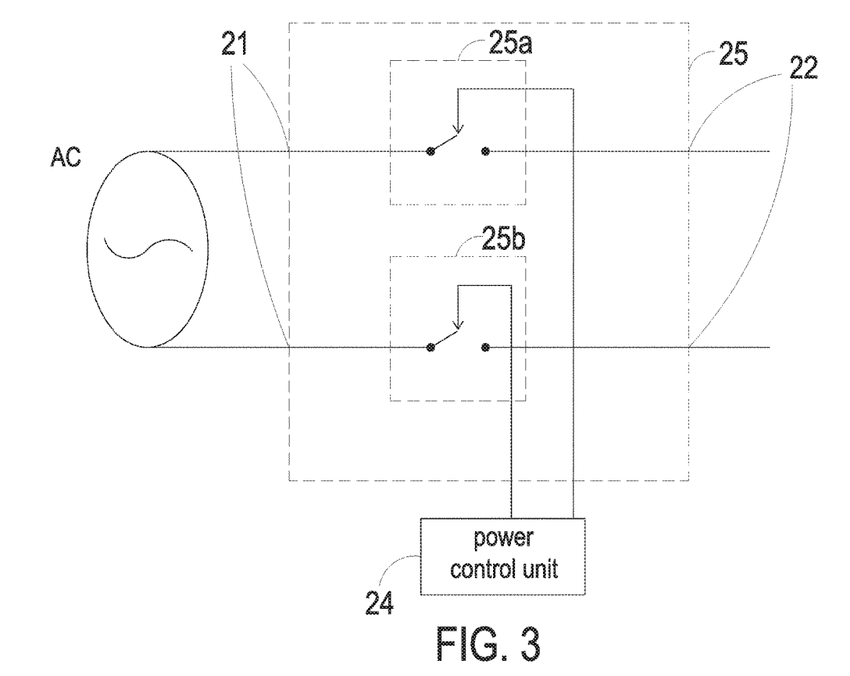
FIG. 3 is a schematic circuit diagram illustrating the power supply device of the charging system of FIG. 2.

FIG. 3 is a schematic circuit diagram illustrating the power supply device of the charging system of FIG. 2. As shown in FIG. 3, the first switching module 25 comprises a first switch 25a and a second switch 25b. The first switch 25a is electrically connected between the positive terminal of the first power transmission terminal 21 and the positive terminal of the second power transmission terminal 22. The second switch 25b is electrically connected between the negative terminal of the first power transmission terminal 21 and the negative terminal of the second power transmission terminal 22. The on/off states of the first switch 25a and the second switch 25b are controlled by the power control unit 24. When the first switch 25a and the second switch 25b are conduct, the AC power is transmitted from the first power transmission terminal 21 to the second power transmission terminal 22 through the first switch 25a and the second switch 25b. When the first switch 25a and the second switch 25b are off, the AC power cannot be transmitted from the first power transmission terminal 21 to the second power transmission terminal 22.

Figure 4:
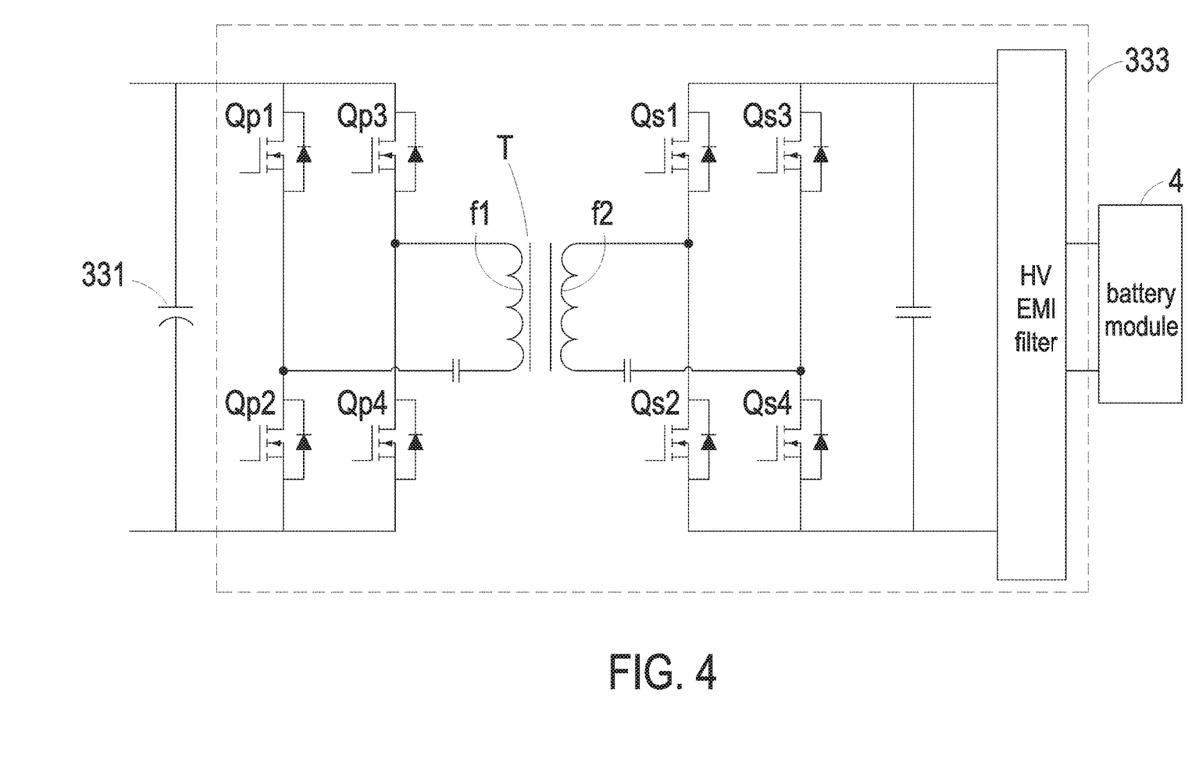
FIG. 4 is a schematic circuit diagram illustrating the DC/DC converter of the charging system of FIG. 2.

FIG. 4 is a schematic circuit diagram illustrating the DC/DC converter of the charging system of FIG. 2. As shown in FIG. 4, the DC/DC converter 332 comprises plural first switch transistors Qp1, Qp2, Qp3, Qp4, plural second switch transistors Qs1, Qs2, Qs3, Qs4, and a transformer T. The first switch transistors Qp1, Qp2, Qp3 and Qp4 are electrically connected between the bus capacitor 331 and the primary winding f1 of the transformer T. The second switch transistors Qs1, Qs2, Qs3 and Qs4 are electrically connected between the secondary winding f2 of the transformer T and the battery module 4. The on/off states of the Qp1~Qp4 and Qs1~Qs4 are controlled by the charging controller 35.

Consequently, the DC/DC converter 332 performs in the forward direction or the backward direction.

Figure 5:
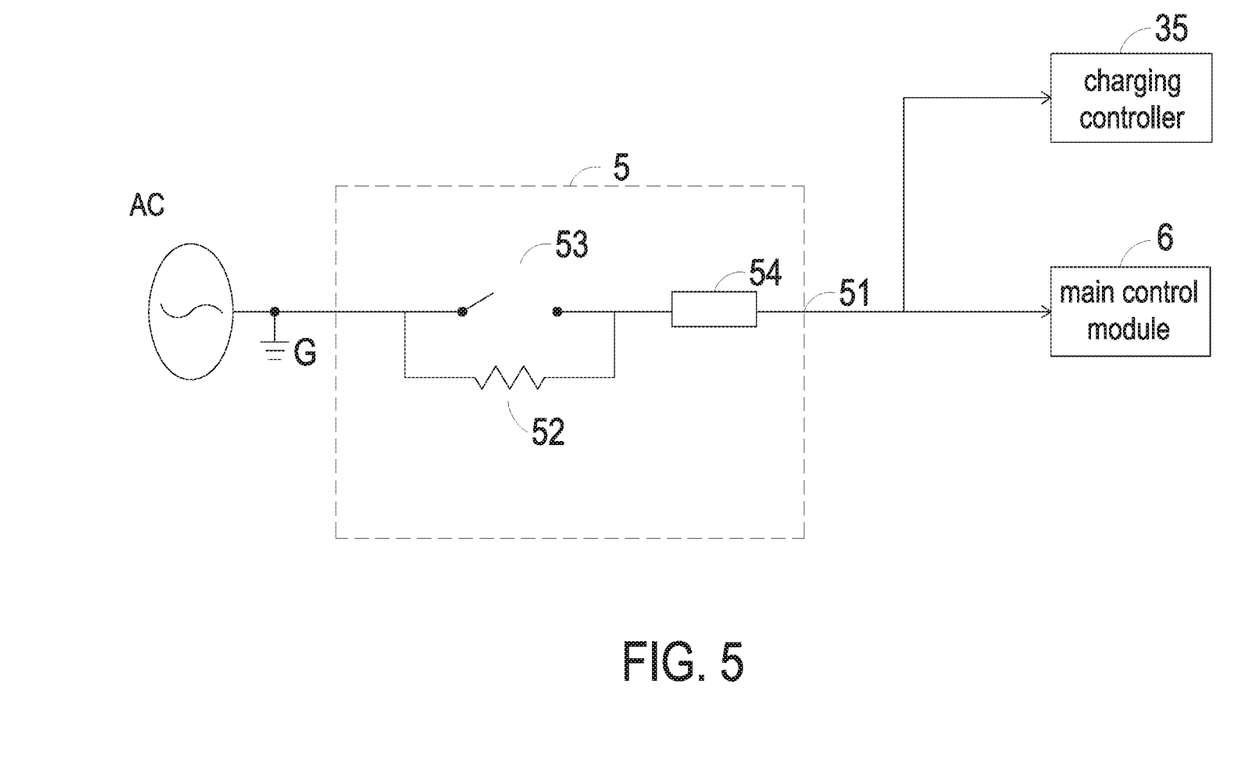
FIG. 5 is a schematic circuit diagram illustrating the connection confirmation module of the charging system of FIG. 2.

FIG. 5 is a schematic circuit diagram illustrating the connection confirmation module of the charging system of FIG. 2. As shown in FIG. 5, the connection confirmation module 5 comprises a third resistor 52, a fourth switching module 53 and a RC circuit 54. The third resistor 52 and the fourth switching module 53 are connected with each other in parallel. The RC circuit 54 is a circuitry composed of a resistor and a capacitor. A first end of the parallel-connected circuitry of the third resistor 52 and the fourth switching module 53 is electrically connected with the ground terminal. A second end of the parallel-connected circuitry of the third resistor 52 and the fourth switching module 53 is electrically connected with the second signal output terminal 51.

In an embodiment, the given voltage is 12V, the second threshold value is 9V, and the third threshold value is 6V. The operations of the charging system 1 will be described as follows.

After the charging system 1 starts up and the battery module 4 and the charging module 3 are electrically connected with each other, the charging controller 35 of the charging module 3 judges whether the voltage from the battery module 4 is a non-zero voltage and the peak voltage of the adjusting terminal 341 is the given voltage. If the charging controller 35 judges that the voltage from the battery module 4 is not the non-zero voltage or the peak voltage of the adjusting terminal 341 is not the given voltage, the charging controller 35 judges that the charging system 1 is abnormal and generates a notification signal.

If the charging controller 35 of the charging module 3 judges that the voltage from the battery module 4 is the non-zero voltage and the peak voltage of the adjusting terminal 341 is the given voltage because the given voltage of the first signal output terminal 23 is transmitted to the adjusting terminal 341, the charging controller 35 controls the DC/DC converter 332 of the power converting unit 33 in the backward direction. Consequently, the bus capacitor 331 is pre-charged by the battery module 4.

If the charging controller 35 judges that the voltage of the bus capacitor 331 is higher than or equal to the first threshold value because of pre-charging, the charging controller 35 controls the voltage regulator 34 to adjust the peak voltage of the adjusting terminal 341 toward a second threshold value. Consequently, the peak voltage of the adjusting terminal 341 is equal to the second threshold value. If the peak voltage of the adjusting terminal 341 is not equal to the second threshold value while the voltage of the adjusting terminal 341 is adjusted toward the second threshold value by the voltage regulator 34 under control of the charging controller 35, the charging controller 35 judges that the charging system 1 is abnormal and generates the notification signal. Whereas, if the peak voltage of the adjusting terminal 341 is equal to the second threshold value, the charging controller 35 judges that the charging system 1 is in the normal working mode.

When the power control unit 24 detects that the peak voltage of the adjusting terminal 341 is equal to the second threshold value, the power control unit 24 also judges that the charging system 1 is ready to charge the battery module 4. Then, the power control unit 24 performs a self-test process. If the self-test result of the power control unit 24 indicates that the power control unit 24 do not have faults, the power control unit 24 issues a pulse modulation signal (e.g., 9V) to the charging controller 35. Consequently, charging controller 35 performs a self-test process. If the self-test result of the charging controller 35 indicates that the charging module 3 do not have faults and the charging system 1 is in the normal working mode, the charging controller 35 controls the voltage regulator 34 to adjust the peak voltage of the adjusting terminal 341 toward a third threshold value. If the power control unit 24 detects that the peak voltage of the adjusting terminal 341 is equal to the third threshold value, the first switching module 25 is turned on under control of the power control unit 24. Consequently, the AC power is transmitted to the third power transmission terminal 31. Moreover, the charging controller 35 controls the power converting unit 33 in the forward direction. Consequently, the AC power from the power supply device 2 is converted by the power converting unit 33, and the battery module 4 is charged by the converted electric power.

Figure 6:
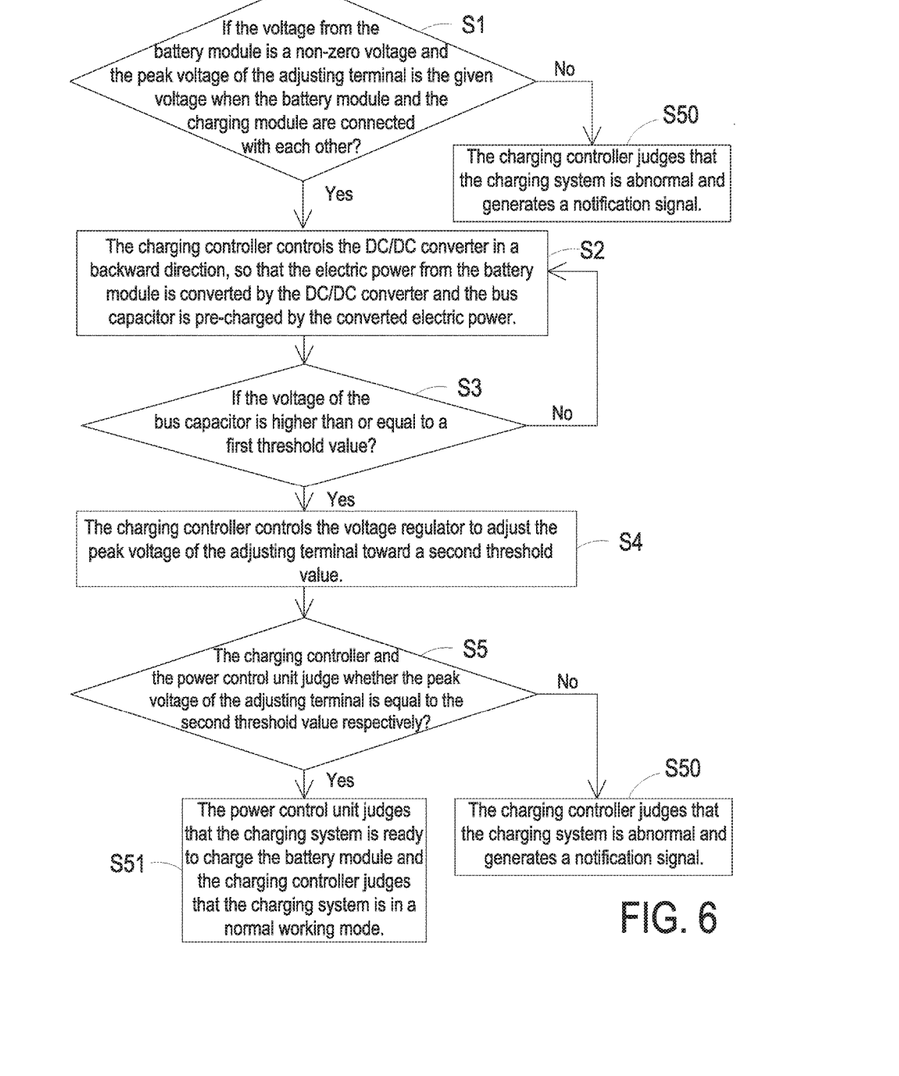
FIG. 6 is a flowchart illustrating a method for a charging system according to an embodiment of the present invention.

FIG. 6 is a flowchart illustrating a method for a charging system according to an embodiment of the present invention.

In a step S1, the battery module 4 and the charging module 3 are electrically connected with each other, but the power converting unit 33 is not enabled. Meanwhile, the charging controller 35 of the charging module 3 judges whether the voltage from the battery module 4 is a non-zero voltage and the peak voltage of the adjusting terminal 341 is the given voltage. If the judging result of the step S1 indicates that the voltage from the battery module 4 is not the non-zero voltage or the peak voltage of the adjusting terminal 341 is not the given voltage, a step S50 is performed. In the step S50, the charging controller 35 judges that the charging system 1 is abnormal and generates a notification signal.

If the judging result of the step S1 indicates that the voltage from the battery module 4 is the non-zero voltage and the peak voltage of the adjusting terminal 341 is the given voltage, a step S2 is performed. In the step S2, the charging controller 35 controls the DC/DC converter 332 in a backward direction. Consequently, the electric power from the battery module 4 is converted by the DC/DC converter 332, and the bus capacitor 331 is pre-charged by the converted electric power.

After the step S2, a step S3 is performed. In the step S3, the charging controller 35 judges whether the voltage of the bus capacitor 331 is higher than or equal to a first threshold value. If the judging result of the step S3 indicates that the voltage of the bus capacitor 331 is lower than the first threshold value, the step S2 is repeatedly done. If the judging result of the step S3 indicates that the voltage of the bus capacitor 331 is higher than or equal to the first threshold value, a step S4 is performed.

In the step S4, the charging controller 35 controls the voltage regulator 34 to adjust the peak voltage of the adjusting terminal 341 toward a second threshold value. Then, a step S5 is performed.

In the step S5, the charging controller 35 and the power control unit 24 judge whether the peak voltage of the adjusting terminal is equal to the second threshold value respectively. If the judging result of the step S5 indicates that the peak voltage of the adjusting terminal is not equal to the second threshold value, the step S50 is performed. Whereas, if the judging result of the step S5 indicates that the peak voltage of the adjusting terminal is equal to the second threshold value, the power control unit 24 judges that the charging system is ready to charge the battery module 4 and the charging controller 35 judges that the charging system is in a normal working mode (Step S51).

Moreover, in the step S4, the second switching module 343 is turned on under control of the charging controller 35.

Since the path between the ground terminal G and the adjusting terminal 341 is conducted, the peak voltage of the adjusting terminal 341 is pulled down by the first resistor 342 and the voltage of the first signal output terminal 23 is adjusted toward the second threshold value.

Figure 7:
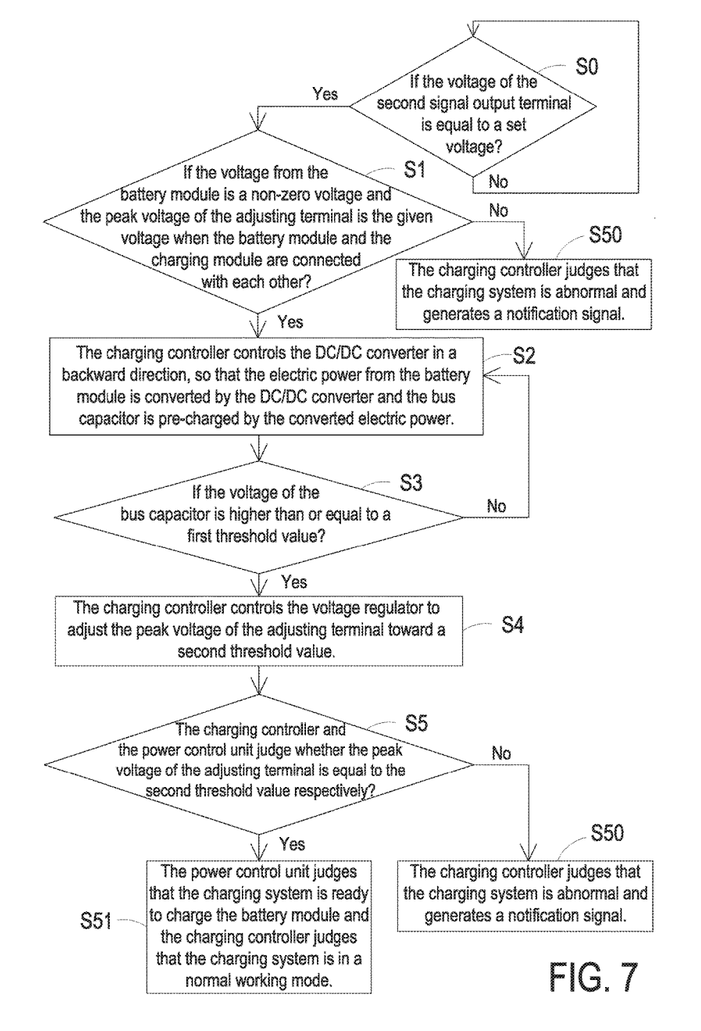
FIG. 7 is a flowchart illustrating a variant example of the method of FIG. 6.

FIG. 7 is a flowchart illustrating a variant example of the method of FIG. 6. In comparison with FIG. 6, the method of this embodiment further comprises a step S0 before the step S1. In the step S0, the charging controller 35 judges whether the voltage of the second signal output terminal 51 is equal to a set voltage. If the judging result of the step S0 indicates that the voltage of the second signal output terminal 51 is equal to the set voltage, the step S1 is performed. If the judging result of the step S0 indicates that the voltage of the second signal output terminal 51 is not equal to the set voltage, the step S0 is repeatedly done. The other steps of FIG. 7 are similar to those of FIG. 6, and are not redundantly described herein.

Figure 8:
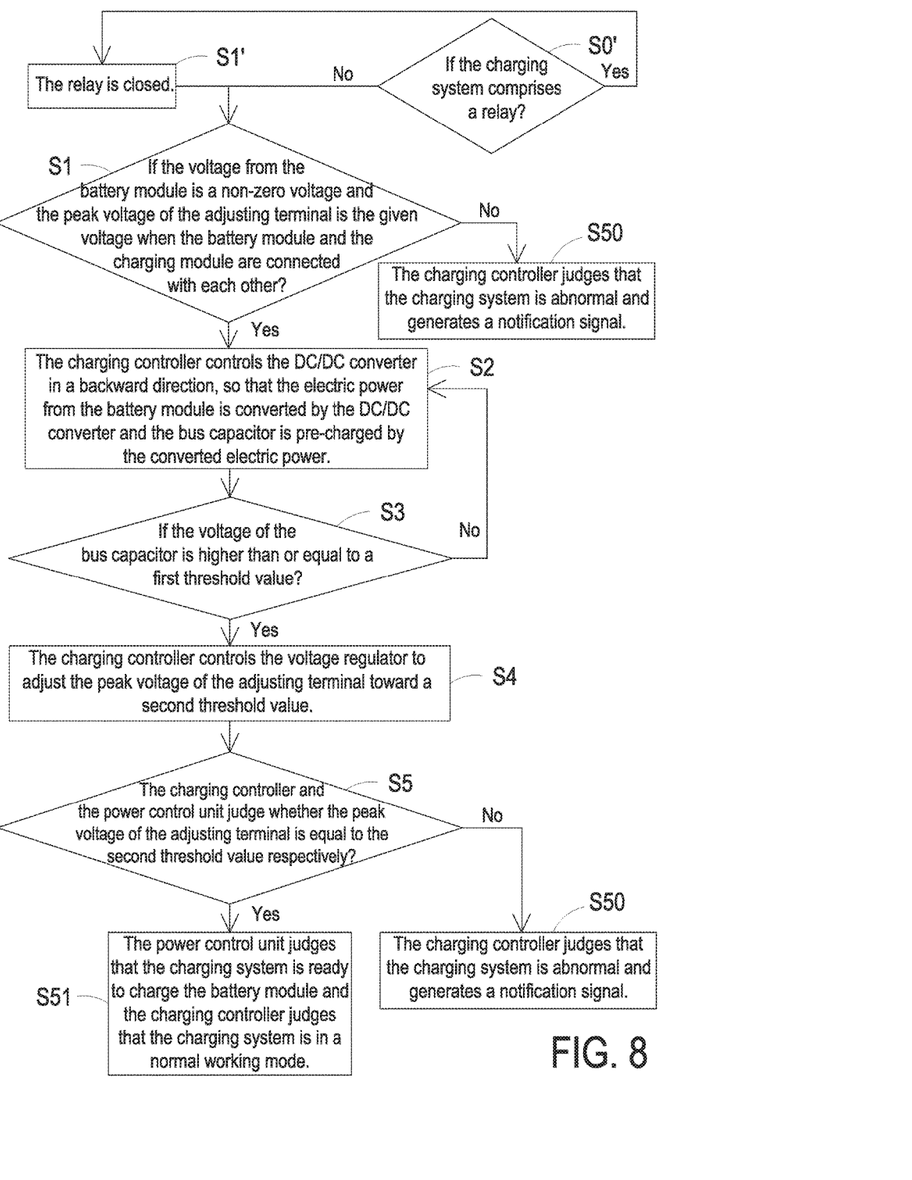
FIG. 8 is a flowchart illustrating a variant example of the method of FIG. 7.

FIG. 8 is a flowchart illustrating a variant example of the method of FIG. 7. In comparison FIG. 7, the method of this embodiment further comprises a step S0' of judging whether the charging system 1 comprises a relay before the step S1. If the judging result of the step S0' indicates that the charging system 1 comprises a relay (e.g., the relay 36 of FIG. 2), a step S1' is performed to close the relay 36. After the step S1', the step S1 is performed. If the judging result of the step S0' indicates that the charging system 1 does not comprise a relay, the step S1 is directly performed.

Figure 9:
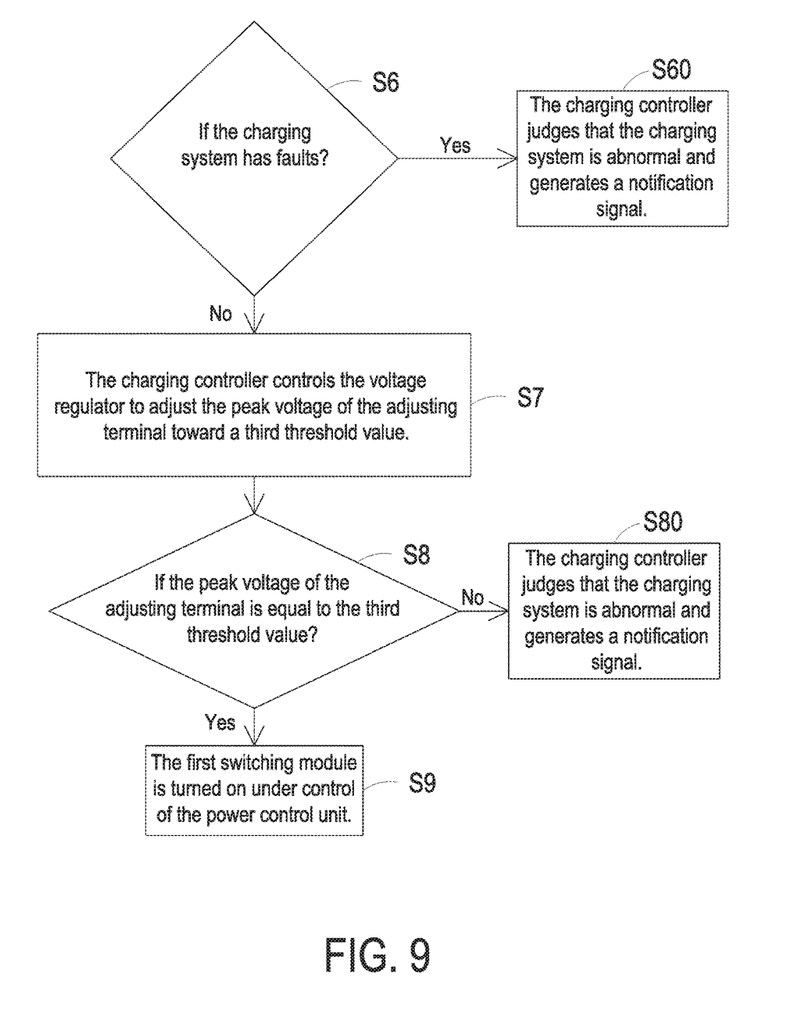
FIG. 9 is a flowchart illustrating the subsequent steps of the method of the present invention after the step S51 of FIG. 6.

FIG. 9 is a flowchart illustrating the subsequent steps of the method of the present invention after the step S51 of FIG. 6. After the step S51 of FIG. 6, a self-test process is performed to judge whether the charging module 3 has faults (Step S6). If the judging result of the step S6 indicates that the charging module 3 has faults, a step S60 is performed. In the step S60, the charging controller 35 judges that the charging system 1 is abnormal and generates the notification signal. Whereas, if the judging result of the step S6 indicates that the charging module 3 do not have faults, a step S7 is performed.

In the step S7, the charging controller 35 controls the voltage regulator 34 to adjust the peak voltage of the adjusting terminal 341 toward a third threshold value. Then, a step S8 is performed.

In the step S8, the power control unit 24 judges whether the peak voltage of the adjusting terminal 341 is equal to the third threshold value. If the judging result of the step S8 indicates that the voltage of the adjusting terminal 341 is not equal to the third threshold value, a step S80 is performed. In the step S80, charging controller 35 judges that the charging system 1 is abnormal and generates the notification signal. If the judging result of the step S8 indicates that the voltage of the adjusting terminal 341 is equal to the third threshold value, a step S9 is performed.

In the step S9, the first switching module 25 is turned on under control of the power control unit 24.

Figure 10:
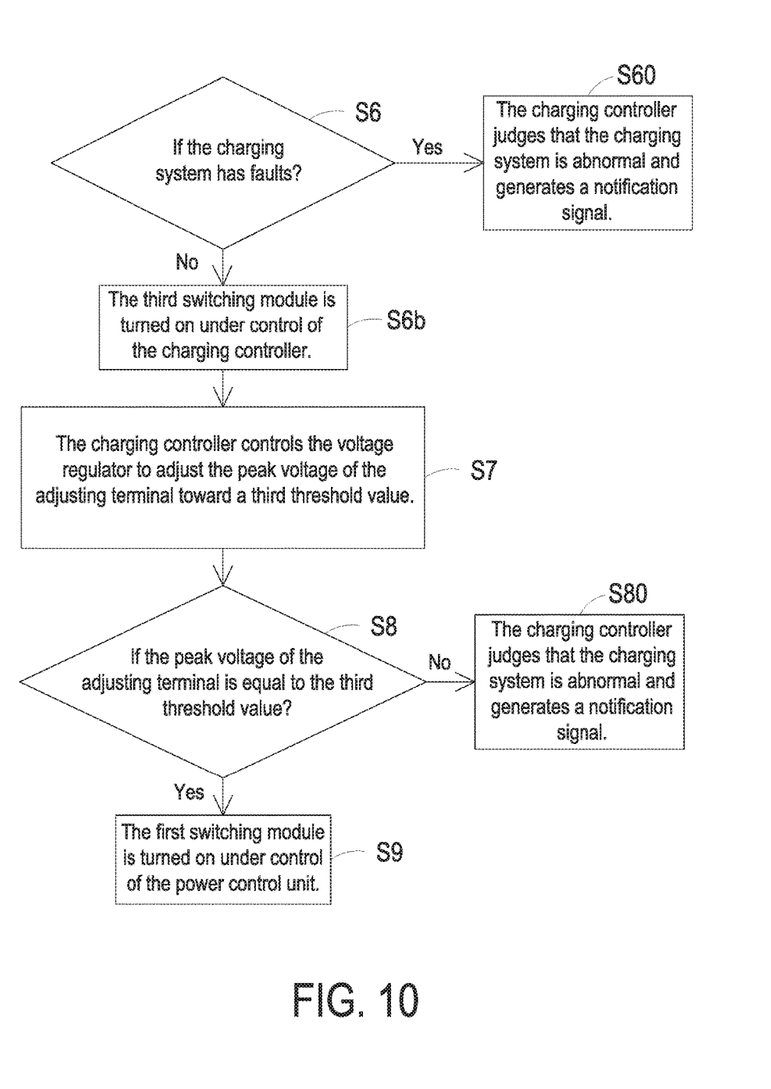
FIG. 10 is a flowchart illustrating a variant example of the method of FIG. 9.

FIG. 10 is a flowchart illustrating a variant example of the method of FIG. 9. The method further comprises a step S6b between the step S6 and S7. If the judging result of the step S6 indicates that the charging module 3 do not have faults, the step S6b is performed. In the step S6b, the third switching module 345 is turned on under control of the charging controller 35. Then, the step S7 is performed. The other steps of FIG. 10 are similar to those of FIG. 9, and are not redundantly described herein.

From the above descriptions, the present invention provides a charging system and a method. When the power supply device is connected with the charging module and the charging system starts up, the power converting unit is in the backward direction and uses the electric power of the battery module to pre-charge the bus capacitor. Then the power supply device outputs the AC power and the power converting unit in the forward direction, the battery module is charged by the AC power. Since the bus capacitor is pre-charged to a predetermined voltage, large current is avoided to flow through the bus capacitor. Under this circumstance, the inrush current is limited when the charging system starts up. Since the inrush current is limited, the internal electronic components of the charging system are not damaged. Moreover, since the charging system is not equipped with the AC relay and the current-limiting resistor, the cost of the charging system is reduced and the reliability of the charging system is enhanced. Moreover, the charging system can be applied to the high power environment.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A charging system, comprising:
a power supply device comprising a first power transmission terminal, a second power transmission terminal, a first signal output terminal and a power control unit, wherein the first power transmission terminal receives AC power;
a connection confirmation module comprising a second signal output terminal;
a battery module;
a charging module comprising a third power transmission terminal and a fourth power transmission terminal, wherein the third power transmission terminal is detachably connected with the second power transmission terminal of the power supply device, and the charging module comprises a DC/DC converter, a voltage regulator, a bus capacitor and a charging controller, wherein the DC/DC converter is a bidirectional power converter and is electrically connected between the bus capacitor and the fourth power transmission terminal, the fourth power transmission terminal is further connected with the battery module, an adjusting terminal of the voltage regulator is detachably connected with the first signal output terminal, the voltage regulator selectively adjusts a voltage of the adjusting terminal, and the power control unit detects a voltage of the adjusting terminal, and the charging controller receives a voltage of the second signal output terminal and the voltage of the adjusting terminal and detects a voltage of the battery module; and
a main control module connected with the charging module and the second signal output terminal for receiving a feedback signal from the charging module and a signal from the second signal output terminal,
wherein if the charging controller detects that the voltage from the battery module is non-zero and the voltage from the adjusting terminal is a given voltage when the charging module is connected with the power supply device, the charging controller controls the DC/DC converter in a backward direction to convert electric power from the battery module, so that the bus capacitor is pre-charged by the converted electric power of the battery module, wherein if the charging controller judges that a voltage of the bus capacitor is higher than or equal to a first threshold value, the charging controller controls the voltage regulator to adjust the voltage of the adjusting terminal toward a second threshold value, wherein if the power control unit detects that a peak voltage of the adjusting terminal is equal to the second threshold value, the power control unit judges that the charging system is ready to charge the battery module.

2. The charging system according to claim 1, wherein the charging controller detects the voltage of the second signal output terminal, and the charging controller judges that the charging module is connected with the power supply device if the voltage of the second signal output terminal is equal to a set voltage.

3. The charging system according to claim 1, wherein the power supply device further comprises a first switching module, and the first switching module is electrically connected between the first power transmission terminal and the second power transmission terminal, wherein a control terminal of the first switching module is electrically connected with a first output terminal of the power control unit, and the power control unit controls on/off states of the first switching module.

4. The charging system according to claim 3, wherein if the charging system is in the normal working mode, the charging controller controls the voltage regulator to adjust the voltage of the adjusting terminal toward a third threshold value, wherein if the power control unit detects that the peak voltage of the adjusting terminal is equal to the third threshold value, the first switch module is turned on under control of the power control unit.

5. The charging system according to claim 3, wherein the first switching module comprises a first switch and a second switch, wherein the first switch is electrically connected between a positive terminal of the first power transmission terminal and a positive terminal of the second power transmission terminal, the second switch is electrically connected between a negative terminal of the first power transmission terminal and a negative terminal of the second power transmission terminal, and the power control unit controls on/off states of the first switch and the second switch.

6. The charging system according to claim 1, wherein the charging module further comprises an AC/DC converter, and the AC/DC converter is electrically connected between the third power transmission terminal and the bus capacitor, and connected with the charging controller, wherein after the AC power is received by the third power transmission terminal, the AC power is converted into a DC bus voltage by the AC/DC converter.

7. The charging system according to claim 6, wherein the AC/DC converter is a bridgeless power factor correction converter.

8. The charging system according to claim 6, wherein the charging controller controls operations of the DC/DC converter, wherein when the DC/DC converter in a forward direction, the DC bus voltage of the bus capacitor is converted into a regulated voltage by the DC/DC converter and the battery module is charged by the regulated voltage, wherein when the DC/DC converter is in a backward direction, the electric power from the battery module is converted by the DC/DC converter so as to pre-charge the bus capacitor.

9. The charging system according to claim 8, wherein the DC/DC converter comprises plural first switch transistors, plural second switch transistors and a transformer, wherein the plural first switch transistors are electrically connected between the bus capacitor and a primary winding of the transformer, the plural second switch transistors are electrically connected between a secondary winding of the transformer and the battery module, and on/off states of the first switch transistors and the second switch transistors are controlled by the charging controller.

10. The charging system according to claim 1, wherein the voltage regulator comprises a first resistor and a second switching module, and the first resistor and the second switching module are connected with each other in series and electrically connected between a ground terminal and the adjusting terminal, wherein the charging controller controls on/off states of the second switching module.

11. The charging system according to claim 10, wherein if the charging controller detects that the voltage of the bus capacitor is higher than or equal to the first threshold value, the second switching module is turned on under control of the charging controller.

12. The charging system according to claim 11, wherein the voltage regulator further comprises a second resistor and a third switching module, the second resistor and the third switching module are connected with each other in series and electrically connected between the ground terminal and the adjusting terminal, and the second resistor and the third switching module are connected with the first resistor and the second switching module in parallel, wherein the charging controller controls on/off states of the third switching module.

13. The charging system according to claim 4, wherein the set voltage is 12V, the second threshold value is 9V, and the third threshold value is 6V.

14. The charging system according to claim 1, wherein the charging system further comprises a relay, and the relay is electrically connected with the battery module and the charging module.

15. A method for a charging system, the charging system comprising a power supply device, a charging module and a battery module, the power supply device comprising a first signal output terminal and a power control unit, the charging module being detachably connected with the power supply device and comprising a DC/DC converter, a voltage regulator, a charging controller and a bus capacitor, the DC/DC converter being electrically connected between the bus capacitor and the battery module, an adjusting terminal of the voltage regulator being detachably connected with the first signal output terminal, the voltage regulator selectively adjusting a voltage of the adjusting terminal, the battery module being detachably connected with the charging module, the method comprising steps of:

(a) the charging controller judging whether a voltage from the battery module is a non-zero voltage and a peak voltage of the adjusting terminal is a given voltage, wherein if a judging result of the step (a) is satisfied, a step (b) is performed, wherein if the judging result of the step (a) is not satisfied, the charging controller judges that the charging system is abnormal and generates a notification signal;

(b) the charging controller controlling the DC/DC converter in a backward direction, so that electric power from the battery module is converted by the DC/DC converter and the bus capacitor is pre-charged by the converted electric power, then the step (c) is performed;

(c) the charging controller judging whether a voltage of the bus capacitor is higher than or equal to a first threshold value, wherein if a judging result of the step (c) is satisfied, a step (d) is performed, wherein if the judging result of the step (c) is not satisfied, the step (b) is repeatedly done;

(d) the charging controller controlling the voltage regulator to adjust the peak voltage of the adjusting terminal toward a second threshold value, and a step (e) is performed; and (e) the charging controller judging whether the peak voltage of the adjusting terminal is equal to the second threshold value, wherein if the peak voltage of the adjusting terminal is equal to the second threshold value, the charging controller judges that the charging system is in a normal working mode, wherein if the peak voltage of the adjusting terminal is not equal to the second threshold value, the charging controller judges that the charging system is abnormal and generates the notification signal.

16. The method according to claim 15, wherein the charging system further comprises a connection confirmation module, and the connection confirmation module comprises a second signal output terminal, wherein before the step (a), the method further comprises a step (a0) of judging whether a voltage of the second signal output terminal is equal to a set voltage, wherein if the voltage of the second signal output terminal is equal to the set voltage, the charging controller judges that the charging module is connected with the power supply device and then the step (a) is performed, wherein if the voltage of the second signal output terminal is not equal to the set voltage, the step (a0) is repeatedly done.

17. The method according to claim 15, wherein before the step (a), the method further comprises a step (a1) of judging whether the charging system comprises a relay between the charging module and the battery module, wherein if a judging result of the step (a1) is satisfied, the step (a) is performed after the relay is closed, wherein if the judging result of the step (a1) is not satisfied, the step (a) is directly performed.

18. The method according to claim 15, wherein the charging module further comprises a first resistor and a second switching module, and the first resistor and the second switching module are connected with each other in series and electrically connected between a ground terminal and the adjusting terminal, wherein if a judging result of the step (d) indicates that the peak voltage of the adjusting terminal is higher than or equal to the second threshold value, the second switching module is turned on under control of the charging controller, so that the peak voltage of the adjusting terminal is adjusted toward the second threshold value by the voltage regulator.

19. The method according to claim 15, wherein the power supply device further comprises a first power transmission terminal, a second power transmission terminal and a first switching module, wherein the first power transmission terminal receives AC power, the second power transmission terminal is detachably connected with the charging module, and the first switching module is electrically connected between the first power transmission terminal and the second power transmission terminal, wherein if the charging controller judges that the charging system is in the normal working mode in the step (e), the method further comprises steps of:

(f) performing a self-test process to judge whether the charging module has faults, wherein if a judging result of the self-test process indicates that the charging module do not have faults, a step (g) is performed, wherein if the judging result of the self-test process indicates that the charging module has faults, the charging controller judges that the charging system is abnormal and generates the notification signal;

(g) the charging controller controlling the voltage regulator to adjust the peak voltage of the adjusting terminal toward a third threshold value; and (h) the power control unit judging whether the peak voltage of the adjusting terminal is equal to the third threshold value, wherein if the voltage of the adjusting terminal is equal to the third threshold value, the first switching module is turned on under control of the charging controller, wherein if the voltage of the adjusting terminal is not equal to the third threshold value, the charging controller judges that the charging system is abnormal and generates the notification signal.

20. The method according to claim 19, wherein the charging module further comprises a second resistor and a third switching module, and the second resistor and the third switching module are connected with each other in series and electrically connected between a ground terminal and the adjusting terminal, wherein if a judging result of the self-test process indicates that the charging module do not have faults, the method further comprising a step (f1) of turning on the third switching module under control of the charging controller before the step (g).

* * * * *